(12) United States Patent
Maruoka et al.

(10) Patent No.: US 7,152,647 B2
(45) Date of Patent: Dec. 26, 2006

(54) PNEUMATIC TIRE (75) Inventors: Kiyohito Maruoka, Kobe (JP); Minoru Nishi, Kobe (JP); Atsushi Yamahira, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 189 days.

(21) Appl. No.: 10/843,465

(22) Filed: May 12, 2004

(65) Prior Publication Data
US 2005/0006018 A1 Jan. 13, 2005

(30) Foreign Application Priority Data
May 13, 2003 (JP) ............... 2003-134783
May 30, 2003 (JP) ............... 2003-155094
Jun. 9, 2003 (JP) ............... 2003-164262

(51) Int. Cl.
*B60C 15/00* (2006.01)
(52) U.S. Cl. ............ 152/552; 152/539; 152/548; 152/554
(58) Field of Classification Search ........... 152/209.1, 152/454
See application file for complete search history.

(56) References Cited

U.S. PATENT DOCUMENTS 4,082,132 A 4/1978 Arai et al.
4,721,144 A * 1/1988 Hara et al. ............... 152/541
5,800,642 A * 9/1998 Ohya ..................... 156/110.1

FOREIGN PATENT DOCUMENTS

| EP | 0 557 101 A1 | 8/1993 |
|---|---|---|
| EP | 1 024 033 A2 | 8/2000 |
| EP | 1 066 992 A2 | 1/2001 |
| EP | 1 116 605 A2 | 7/2001 |
| EP | 1 388 435 A1 | 2/2004 |
| JP | 4-283108 | * 10/1992 |
| JP | 2001-80316 A | 3/2001 |
| WO | WO 02/102612 A1 | 12/2002 |

* cited by examiner

*Primary Examiner*—Justin Fischer
(74) *Attorney, Agent, or Firm*—Birch, Stewart Kolasch & Birch, LLP (57) ABSTRACT

A pneumatic tire comprises a tread portion with tread edges, a pair of sidewall portions, a pair of bead portions each with a bead core therein, and a carcass ply of cords comprising a main portion extending between the bead cores through the tread portion and sidewall portions and a wound portion wound around the bead core in each said bead portion from the inside to the outside of the tire, and an edge of the wound portion is disposed between the bead core and a bead apex rubber disposed radially outside the bead core to be secured therebetween.

17 Claims, 7 Drawing Sheets

PNEUMATIC TIRE

This Nonprovisional application claims priority under 35 U.S.C. § 119(a) on Patent Application No(s). 2003-134783; 2003-155094 and 2003-164262, filed in JAPAN on May 13, 2003; May 30, 2003 and Jun. 9, 2003, respectively. The entire contents of which are hereby incorporated by reference.

The present invention relates to a pneumatic tire, more particularly to a bead structure suitable for heavy duty tires being capable of reducing the volume and weight of the bead portion.

Figure 7:
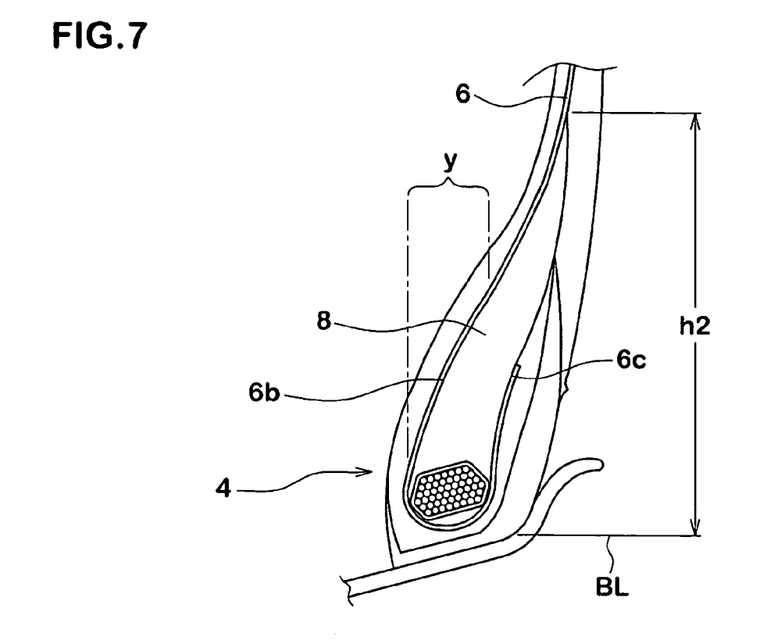
FIG. 7 is a cross sectional view of a conventional bulge bead portion for truck/bus tires.

Usually, pneumatic tires for heavy duty use such as truck/bus tire have bulky bead portions as shown in FIG. 7 in order to withstand severe service conditions such as heavy loads and high inflation pressure.

Figure 8:
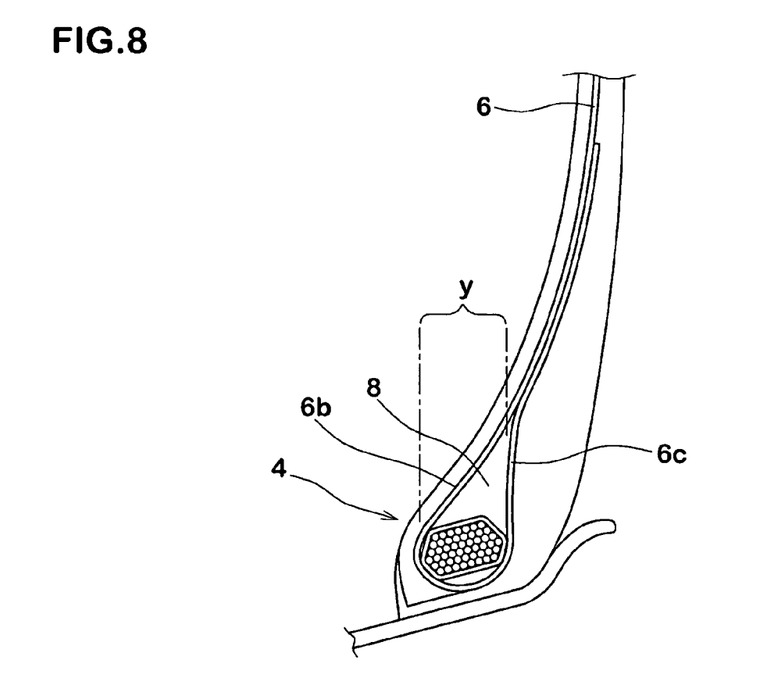
FIG. 8 is a cross sectional view of a prior art slim bead portion for truck/bus tires.

In recent years, on the other hand, in order to reduce the tire weight, so called slim bead structure as shown in FIG. 8 has been proposed in the laid-open Japanese patent application JP-A-H9-11715 (corresponding to U.S. Pat. No. 5,772,811)

In such a slim bead structure, however, as the rigidity of the bead portion is relatively low, bulge in the sidewall portion due to tire inflation becomes increased. As a result, the tire shoulder is pulled radially inside. In the tread shoulder region, therefore, the ground pressure is decreased and uneven wear is increased.

It is therefore, an object of the present invention to provide a pneumatic tire, in which uneven wear in the tread shoulder region is prevented, while achieving sliming of the bead portion.

According to one aspect of the present invention, a pneumatic tire comprises: a tread portion with tread edges; a pair of sidewall portions; a pair of bead portions each with a bead core therein; and a carcass ply of cords comprising a main portion extending between the bead cores through the tread portion and sidewall portions and a wound portion wound around the bead core in each said bead portion from the inside to the outside of the tire, wherein an edge of the wound portion is disposed between the bead core and a bead apex rubber disposed radially outside the bead core to be secured therebetween.

Taking heavy duty radial tires for truck and bus, embodiments of the present invention will now be described in detail in conjunction with the accompanying drawings.

In the drawings, pneumatic tire 1 according to the present invention is under the 5% pressure state, and the tire 1 comprises: a tread portion 2; a pair of axially spaced bead portions 4 each with a bead core 5 therein; a pair of sidewall portions 3 extending between the tread edges Te and the bead portions 4; a carcass 6 extending between the bead portions 4; and a belt 7 disposed radially outside the carcass 6 in the tread portion 2.

The tread portion 2 is provided with three or four main grooves 20 extending continuously in the tire circumferential direction to axially divide the tread portion 2 into circumferential ribs. Further, according to need, axial grooves may be provided to circumferentially divide the ribs into blocks. Therefore, as to the tread pattern, a rib-type, rib-and-block-type or block-type pattern may be employed.

As the following embodiments are heavy duty tires for truck and bus, a tire profile categorized as square shoulder rather than round shoulder is employed, thus, it will be easy to recognize the tread edge Te. However, if unclear, the tread edge Te may be defined as the edges of the ground contacting area under a normal loaded condition in which the tire is mounted on a standard wheel rim and inflated to a standard pressure and then loaded with a standard tire load.

Here, the standard wheel rim is a wheel rim officially approved for the tire by standard organization, i.e. JATMA (Japan and Asia), T&RA (North America), ETRTO (Europe), STRO (Scandinavia) and the like.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

Incidentally, the undermentioned bead base line BL is an axial line passing through a radial position corresponding to the rim diameter of the standard wheel rim.

In this specification, unless otherwise noted, various dimensions of the tire refer to values measured under a 5% pressure state which is such that the tire is mounted on the standard wheel rim and inflated to 5% of the standard pressure, without tire load. Usually, and in this invention in particular, the shape or profile of the tire under the 5% pressure state well corresponds to that of the tire in a vulcanization mold. Thus, the following description of the tire profile is applicable to the profile of the molding surface of the tire mold, and the carcass profile is applicable to the carcass in the mold.

The belt 7 is composed of at least two cross plies of parallel cords. In case of heavy duty tire, at least three plies including said two cross plies. In the illustrated examples, the belt 7 is composed of a radially innermost first ply 7A made of parallel steel cords laid at an angle in the range of from 45 to 75 degrees with respect to the tire equator, and radially outer second, third and fourth plies 7B, 7C and 7D each made of parallel steel cords laid at a smaller angle in the range of from 10 to 35 degrees with respect to the tire equator.

The carcass 6 is composed of at least one ply 6A of cords arranged radially at an angle in the range of from 70 to 90 degrees with respect to the tire equator. The carcass ply 6A is extended between the bead portions 4 and wound around the bead core 5 in each of the bead portions 4 from the inside to the outside of the tire to be secured thereto, forming a pair of wound portions 6*b* and a main portion 6*a* between the bead cores 5. In case of heavy duty tire, steel cords are preferably used as the carcass cords. But, organic fiber cords, e.g. aromatic polyamide, polyester, nylon, rayon and the like may be used alone or in combination with metal cords. In the illustrated examples, the carcass 6 is composed of a single ply of steel cords arranged radially at 90 degrees with respect to the tire equator.

The bead core 5 is a ring of tension element which has a specific cross sectional shape. A shape having a radially inner side SL and a radially outer side SU which become substantially parallel with the wheel rim's bead seat J1 when the tire is mounted on the wheel rim J is preferred because uniform and steady engaging force can be obtained between the tire bead and rim bead seat. For example, rectangle whose corners are rounded, hexagon and the like may be used. The tension element in this example is a steel wire, and the wire is wound in a flattened hexagonal cross sectional shape and wrapped with textile or hard rubber which forms the surface of the bead core 5. In this example, as the wheel rim J is a center-drop 15-degree-taper rim, the bead seat J1 is tapered at 15 degrees with respect to the axial direction. Therefore, the above-mentioned radially inner side SL and outer side SU of the bead core 5 become inclined at 15 degrees.

In the bead portion 4, there is disposed a clinch rubber 9 to form the surface of the bead portion. The clinch rubber 9 is made of a wear-resistant rubber having a JIS type-A-durometer hardness in the range of from 70 to 85 degrees and less than that of the undermentioned bead apex rubber 8.

The bead apex rubber 8 is disposed radially outside the bead core 5 and extends radially outwards along the carcass main portion while tapering towards its radially outer end.

In the sidewall portion 3, a sidewall rubber 3G is disposed axially outside the carcass 6. In the embodiments shown in FIGS. 1, 2, 3 and 4, the clinch rubber 9 does not contact with the bead apex rubber 8, and between them there is inserted the radially inner end of the sidewall rubber 3G which is softer than the clinch rubber 9 to decrease share stress.

On the axially inside of the carcass 6, an thin inner liner GI made of gas-impermeable rubber having a substantially constant thickness is disposed to cover the tire inner surface almost entirely, and the inner surface of the tire facing the tire cavity is formed as being substantially parallel with the inner surface of the carcass 6.

In the tread portion 2, on the other hand, under the 5% pressure state, the camber height h which is the radial distance between the tread edge Te and the radially outermost point (tire equator) TC of the tread face 2S is decreased into a small range, considering the heavy duty tires, of not less than 1.0 mm, preferably more than 2.0 mm, but not more than 10 mm, preferably less than 7 mm.

If the camber height h is more than 10 mm, then the ground contacting length in the tire circumferential direction decreases in the tread shoulder region Ys, and uneven wear increases in this region Ys. If the camber height h is less than 1.0 mm, then uneven wear increases in the tread crown part Yc.

First Embodiment

Figure 1:
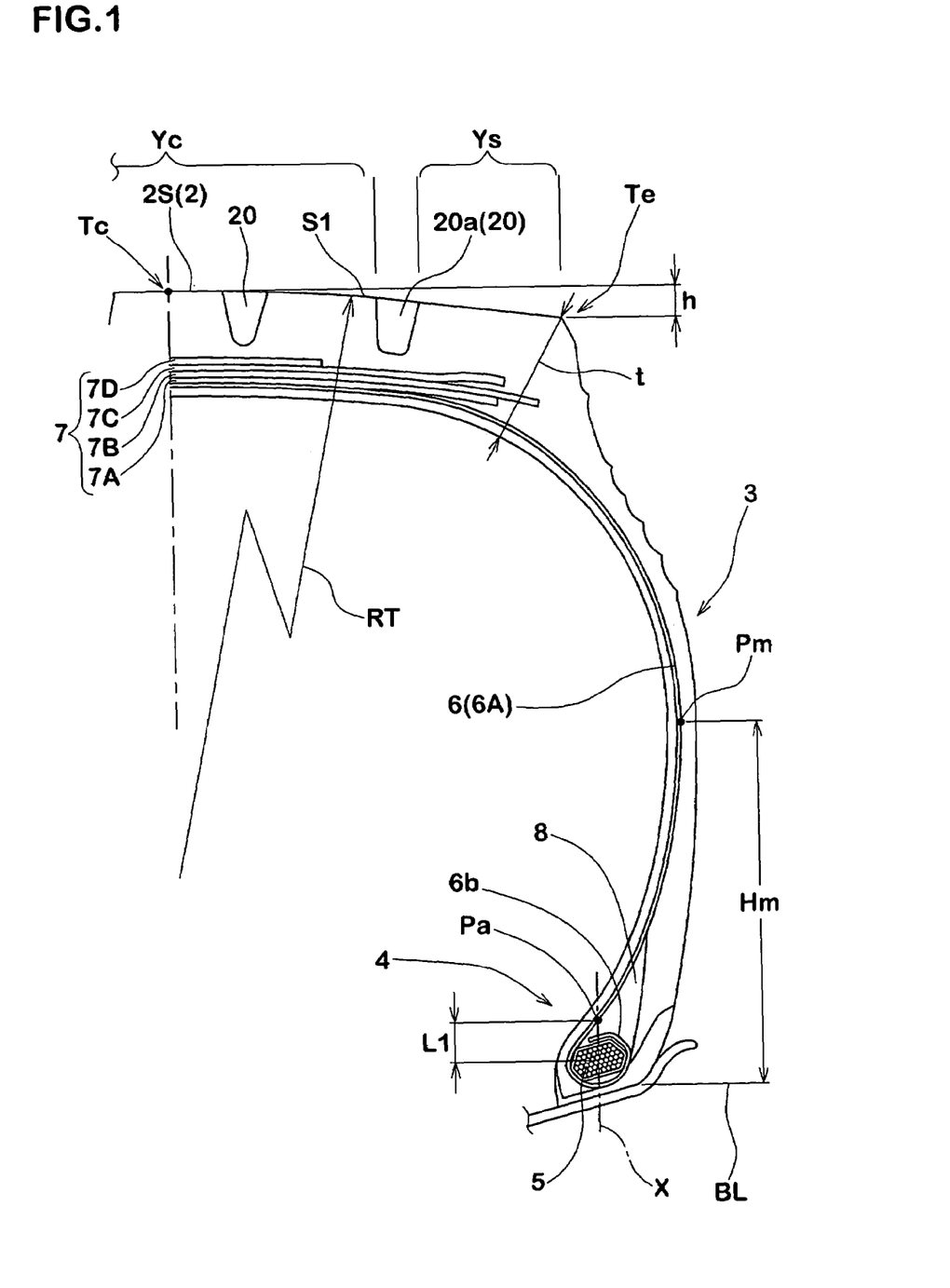
FIG. 1 is a cross sectional view of a pneumatic tire according to the present invention.
Figure 2:
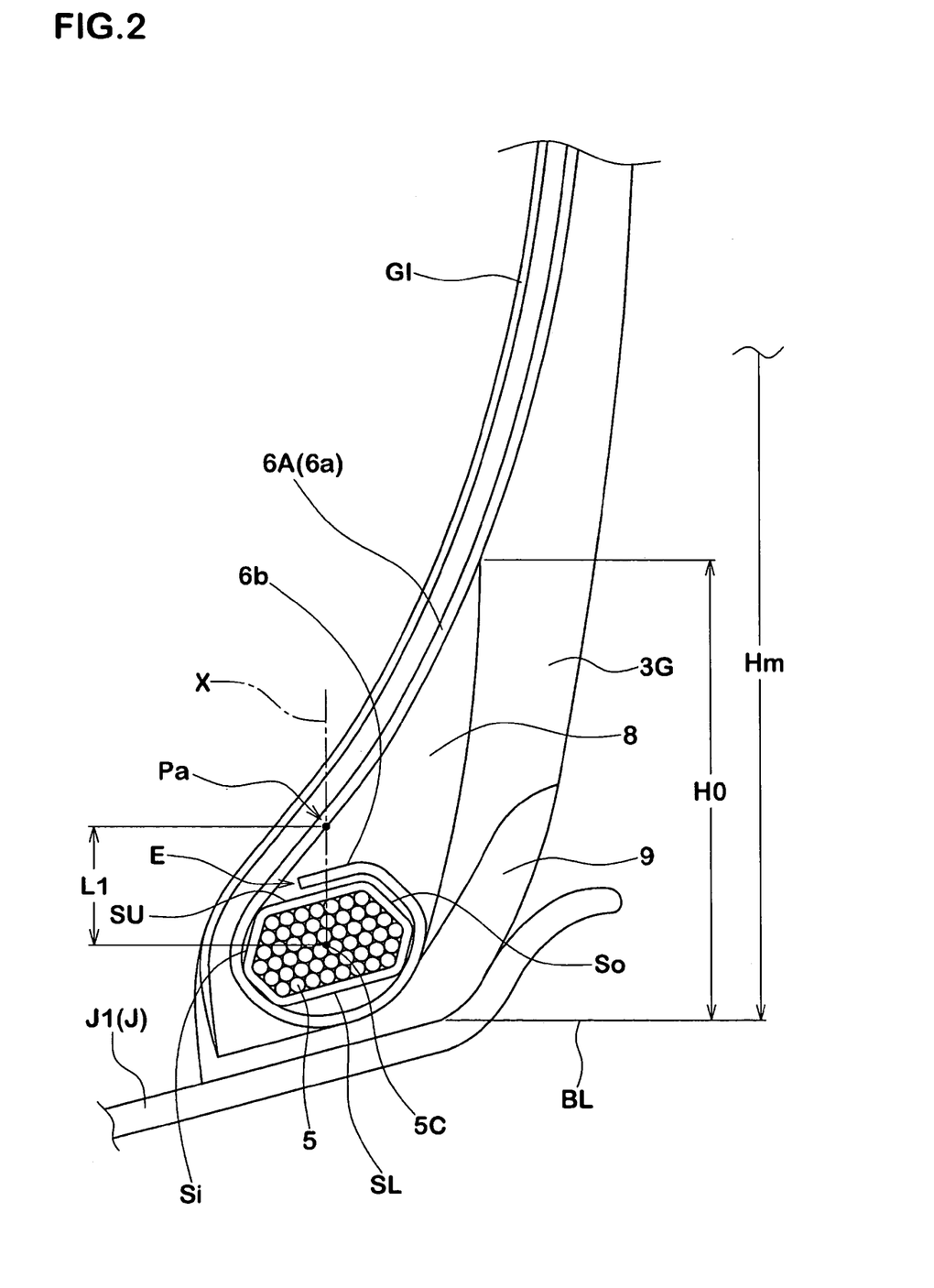
FIG. 2 is an enlarged cross sectional view of the bead portion thereof.

FIGS. 1 and 2 show the first embodiment, wherein the carcass ply edge is disposed adjacent to the radially outer side SU of the bead core 5. The wound portion 6*b* of the carcass 6 extends axially inwards along the radially outer surface SU and terminates before the carcass main portion 6*a* leaving a space Lb between the end E and the main portion 6*a*.

The bead apex rubber 8 is disposed radially outside the wound portion 6*b* to secure the end E thereof between the bead core 5 and the bead apex rubber 8. The bead apex rubber 8 is made of a hard rubber having a JIS type-A-durometer hardness of from 60 to 99 and extends from the bead core 5 into a sidewall lower portion, while tapering radially outwards up to its radially outer end to have a generally triangular cross sectional shape. From the aspect of the bead rigidity and weight reduction, the radial height H0 of the bead apex rubber 8 from the bead base line BL is preferably set in a range of from 30 to 60% of the radial height Hm of the maximum cross sectional width point Pm of the main portion 6*a*.

In this structure, as the end E is positioned near the bead core 5, the end E is prevented from a large stress due to tire deformation, and the bead durability is improved.

In this embodiment, to slim down the bead portion 4, the volume of the bead apex rubber 8 is decreased. In such a structure, there is a tendency for the bead portion 4 to show a falling-down motion towards the axially outside when the tire is inflated, causing the tread shoulder region Ys to be pulled down radially inwards. Therefore, to prevent such unfavorable motions, the carcass profile is limited as follows.

In the meridian section of the tire, the radial height L1 of a point Pa from the centroid 5C of the bead core 5 is set in the range of not less than 0.15 times, preferably more than 0.20 times, but not more than 0.28 times, preferably less than 0.26 times the radial height Hm of the maximum cross sectional width point Pm from the bead base line BL.

Here, the point Pa is the intersecting point of a radial line X passing through the centroid 5C with the axially outer surface of the carcass main portion 6*a*.

Between the points Pa and Pm, the carcass main portion 6*a* is slightly curved convexly, although it may be possible to include a substantially straight part as in the next embodiment.

Further, in the tread portion 2 under the 5% pressure state, the profile thereof is defined by a convexly curved line having a radius of curvature RT of not less than 800 mm, preferably more than 850 mm, but not more than 1500 mm, preferably less than 1100 mm so that the tread profile under the 100% pressure state becomes more flat in comparison with the conventional tires.

The tread profile may be a single radius arc, but in this embodiment, the following multi-radius arc is used.

The tread crown part Yc which is defined between the axially outermost main grooves 20*a* is formed by a curved line S1 having a single radius.

The tread shoulder region Ys which is defined between the axially outermost main groove 20*a* and the tread edge Te is formed by a substantially straight line or alternatively a curved line having a radius larger than that of the curved line S1.

Thus, in case of a single radius arc, the above-mentioned radius of curvature RT corresponds to the single radius. But, to encompass a multi-radius arc, the radius of curvature RT is defined as the radius of a circle passing through three points: the radially outermost point (tire equator) Tc and two tread edges Te.

If the radius of curvature RT is less than 800 mm, then the ground contacting length in the tire circumferential direction decreases in the tread shoulder region Ys, and uneven wear increases in this region Ys. If the radius of curvature RT is more than 1500 mm, then uneven wear increases in the tread crown part Yc.

If the overall thickness t of the tread portion 2 at the tread edge Te is more than 45 mm, as the heat accumulation increases, it becomes difficult to maintain even the minimum high-speed durability. If the overall thickness t is less than 38 mm, as the ground contacting length decreases in the tread shoulder region Ys, uneven wear is liable to occur.

It is therefore, important that the overall thickness t is set in the range of from 38 to 45 mm, wherein the overall thickness t is the shortest distance from the tread edge Te to the inner surface of the tire.

Comparison Tests

Radial tires of size 11R22.5 (Rim size 7.50×22.5) for truck and bus having the structure shown in FIGS. 1 and 2 and the same specifications except for those shown in Table 1 were made, and uneven wear test was conducted.

The tread pattern was a five-rib pattern comprising substantially equi-width ribs divided by four main circumferential grooves having a depth of 14 mm. The tread width was 202 mm. The overall thickness t at the tread edge was 40 mm.

Uneven Wear Test

The test tires were mounted on all the wheels of a 2/2-D-wheel-type truck having a loadage of 10 tons and run for 100,000 km on asphalt paved roads under the rated load or 10 tons and tire pressure of 700 kPa. Then, the depth $\delta c$ of the axially inner circumferential grooves and the depth $\delta s$ of the axially outer circumferential grooves which were decreased by tread wear were measured.

Figure 3:
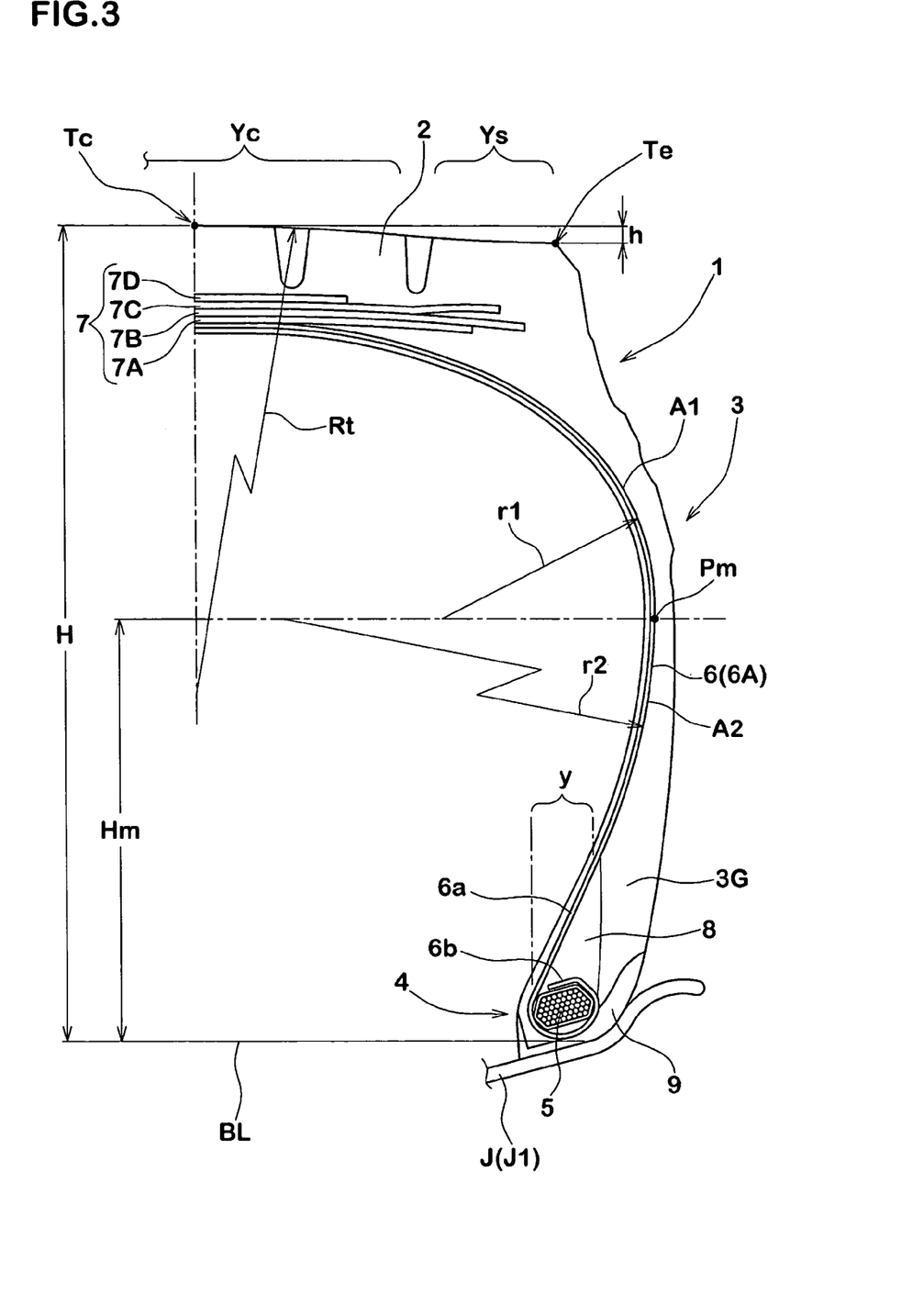
FIG. 3 is a cross sectional view of a pneumatic tire according to the present invention.

Ground Contacting Length Ratio:

With respect to the ground contacting area of the tread under tire pressure of 700 kPa and tire load of 26.7 kN, the ground contacting length Ls at the tread edge and the ground contacting length Lc at the tire equator were measured. The ratio Ls/Lc is shown in Table 1.

a mid-outer part A1 extending radially outwards from the maximum cross sectional width point Pm and having a radius of curvature r1, wherein the maximum cross sectional width point Pm is at a radial height h1 of more than 50% of the tire section height H from the bead base line BL;

a mid-inner part A2 extending radially inwards from the point Pm and having a radius of curvature r2 larger than the radius r1, preferably in the range of from 1.5 to 2.0 (in FIG. 3 example, about 1.75) times the radius r1; and a substantially straight part 6a1 in the above-core region (y) between the radially inner end of the mid-inner part A2 and the bead core (point P4) in respect of the axial position.

The straight part 6a1 extends radially outwards from the radially inner end P4 of the carcass main portion 6a to a radial height h1 (see FIG. 6) of not less than 50%, preferably not less than 60%, more preferably not less than 70% of the radial height H0 (also see FIG. 6) of the bead apex rubber 8, each from the bead base line BL. As to the upper limit, the height h1 is less than that of the maximum cross sectional width point Pm.

Figure 4:
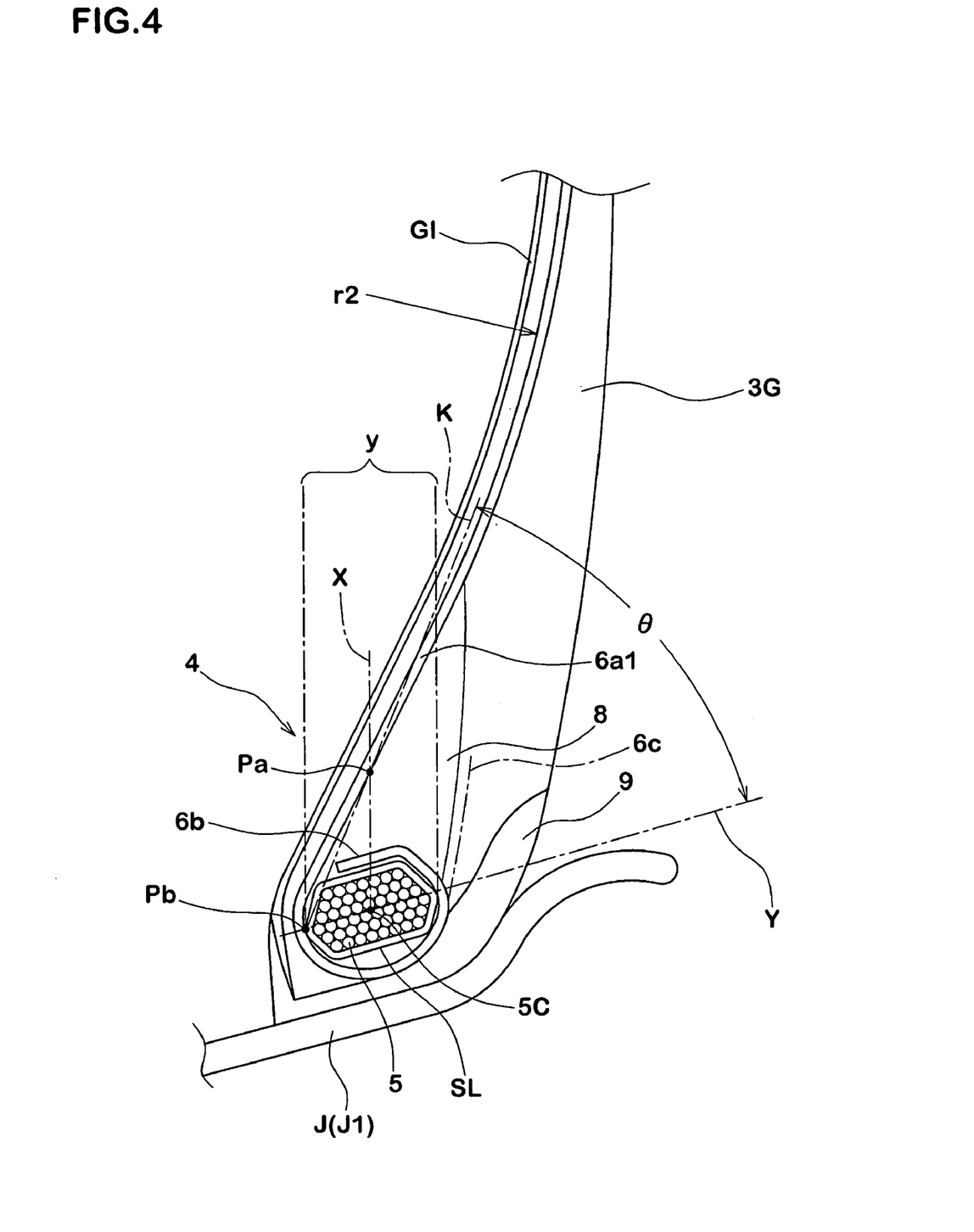
FIG. 4 is an enlarged cross sectional view of the bead portion thereof.

As shown in FIG. 4, the angle $\theta$ between a line Y and a line K is set in the range of not less than 50 degrees, preferably more than 52 degrees, but not more than 60 degrees, preferably less than 58 degrees. The line Y is a straight line which extends in parallel with the radially inner side SL of the bead core 5, passing through the centroid 5C of the bead core 5. Given that point Pb is the intersecting point of the line Y with the carcass main portion 6a on the axially outer surface, the line K is a straight line drawn between the point Pb and the above-mentioned point Pa.

Such a profile can control the undesirable decrease of the tread radius of curvature Rt caused by the full tire inflation, and uneven wear in the tread shoulder region is prevented.

Comparison Tests

Radial tires of size 11R22.5 for truck and bus having the structure shown in FIGS. 3 and 4 and the same specifications except for those shown in Table 2 were made and tested for uneven wear performance and bead durability.

TABLE 1

| Tire | Ex. A1 | Ex. A2 | Ex. A3 | Ex. A4 | Ref. A1 | Ref. A2 | Ref. A3 |
|---|---|---|---|---|---|---|---|
| Radial height L1 (mm) | 22 | 29 | 29 | 29 | 37 | 29 | 29 |
| Radial height L2 (mm) | 114 | 114 | 114 | 114 | 114 | 114 | 114 |
| Ratio L1/L2 | 0.193 | 0.254 | 0.254 | 0.254 | 0.325 | 0.254 | 0.254 |
| Tread | | | | | | | |
| Radius of curvature RT (mm) | 1000 | 1000 | 850 | 1000 | 1000 | 750 | 600 |
| Camber height h (mm) | 4 | 4 | 4 | 5 | 5 | 10 | 11.1 |
| Tire weight (kg) | 48.1 | 49.2 | 48.9 | 49 | 55 | 48.6 | 48 |
| Ground contacting length ratio Ls/Lc | 0.86 | 0.88 | 0.85 | 0.84 | 0.87 | 0.8 | 0.72 |
| Uneven wear performance | | | | | | | |
| Groove depth $\delta c$ avg. (mm) | 7 | 6.86 | 7.14 | 7.28 | 7 | 7.42 | 8.26 |
| Groove depth $\delta s$ avg. (mm) | 6.16 | 6.58 | 6.3 | 5.88 | 6.02 | 5.46 | 4.34 |
| $\delta c - \delta s$ (mm) | 0.84 | 0.28 | 0.84 | 1.4 | 0.98 | 1.96 | 3.92 |

Second Embodiment

FIGS. 3 and 4 show the second embodiment. This embodiment is very similar to the first embodiment. Therefore, only the differences between them will be descried. Reference should be made to the first embodiment with respect to the matters not descried.

In this embodiment, the carcass profile is different in that the carcass main portion 6a in the sidewall portion 3 comprises:

The tread pattern was a five-rib pattern comprising substantially equi-width ribs divided by four main circumferential grooves having a depth of 14 mm. The tread width was 230 mm.

Bead Durability Test

Using a tire test drum, the tire mounted on a 7.50×22.5 rim and inflated to 700 kPa was run under accelerated test conditions (tire load of 26.72 kN×3 or 300% of Max., and running speed of 30 km/h), and the running time until bead damage was measured. The results are indicated in Table 2, using an index based on Ref.1 being 100, wherein the large the index number, the better the durability.

Uneven Wear Test

Same as above. But, the difference δc–δs is indicated by an index based on Ref.1 being 100. The smaller the index number, the lesser the uneven wear.

Form the test results, it was confirmed that the bead durability can be improved while controlling uneven wear in the tread shoulder region.

TABLE 2

| Tire | Ex. B1 | Ex. B2 | Ex. B3 | Ex. B4 | Ex. B5 | Ref. B1 | Ref. B2 |
|---|---|---|---|---|---|---|---|
| Carcass ply | | | | | | | |
| Wound portion | FIG. 4 | FIG. 4 | FIG. 4 | FIG. 4 | FIG. 4(*1) | FIG. 4 | FIG. 4 |
| Angle θ (deg) | 51 | 53 | 56 | 59 | 56 | 62 | 48 |
| Tread radius of curvature Rt (mm) | | | | | | | |
| 5% pressure state (=mold) | 700 | 700 | 700 | 700 | 700 | 700 | 700 |
| 100% pressure state | 490 | 490 | 500 | 500 | 500 | 500 | 440 |
| Bead durability | 120 | 130 | 150 | 150 | 150 | 100 | 150 |
| Uneven wear (index) | 103 | 102 | 100 | 100 | 100 | 100 | 125 |

(*1)As shown in imaginary line, the ply edge (turned-up portion 6c) was turned to extend along the axially outside of the bead apex rubber 8.

Applicability: The carcass profile and tread profile explained in the first embodiment shown in FIGS. 1 and 2, and the carcass profile and tread profile explained in the second embodiment shown in FIGS. 3 and 4, can be combined with the bead structure shown in FIG. 6 comprising the wound portion 6b with the departing part 11 and the rubber filler 12.

Further, it may be possible to combine with the carcass having a turned-up portion 6c instead of the wound portion 6b, wherein the turned-up portion 6c is turned up around the bead core and extends along the axially outside of the bead apex rubber 8 as shown in FIG. 4 by imaginary line.

Third Embodiment

Figure 5:
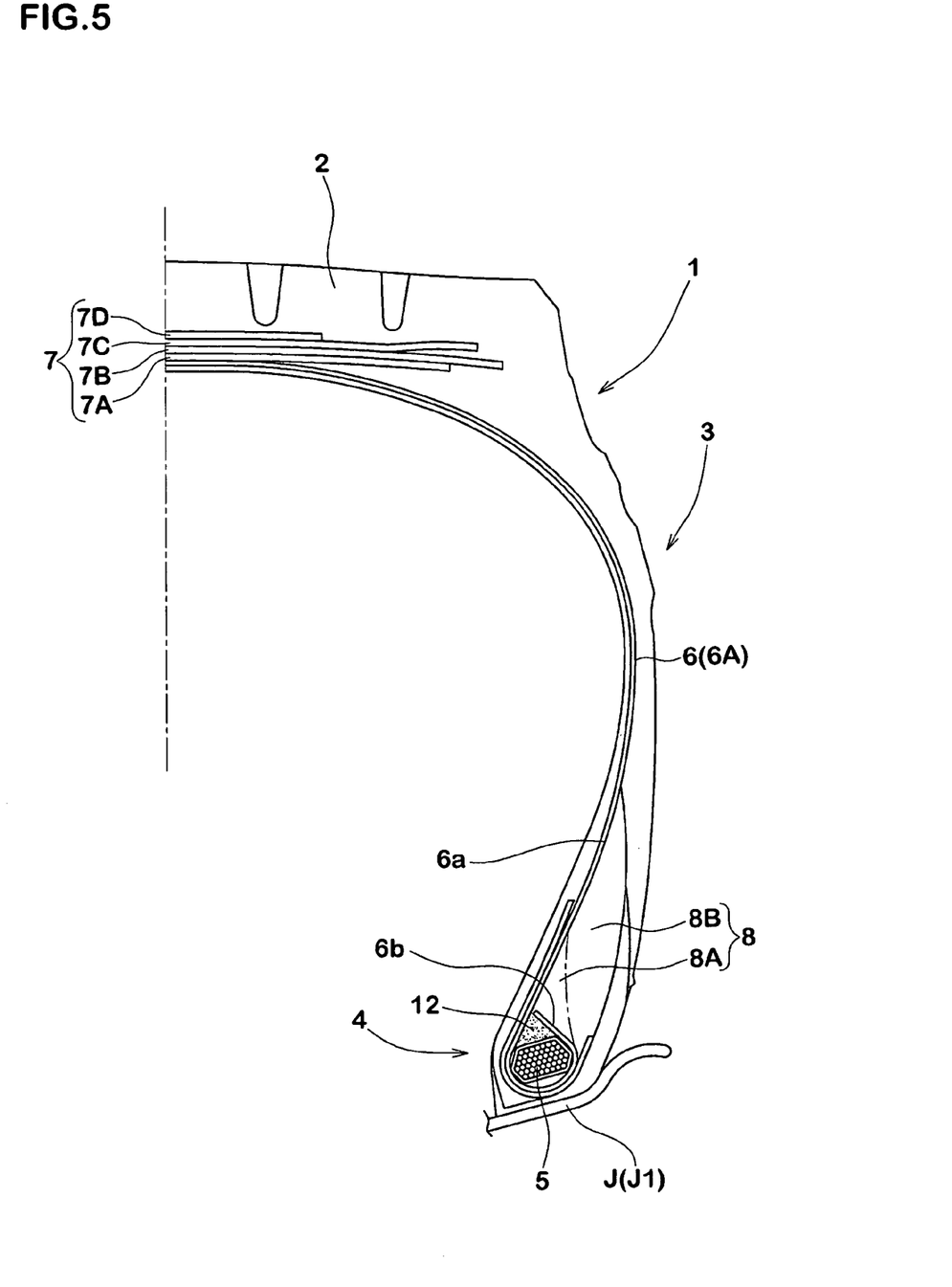
FIG. 5 is a cross sectional view of a pneumatic tire according to the present invention.
Figure 6:
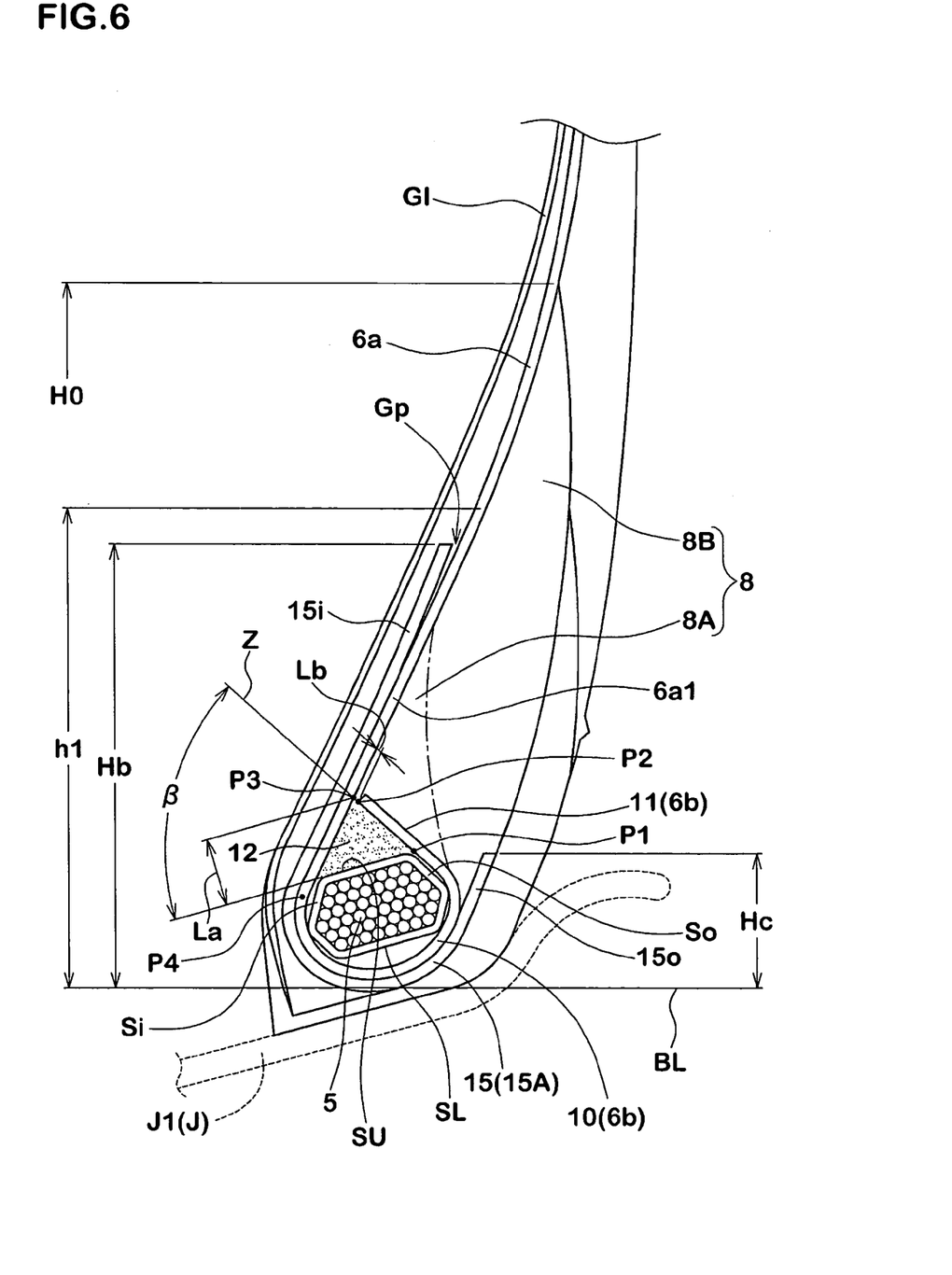
FIG. 6 is an enlarged cross sectional view of the bead portion thereof.

FIGS. 5 and 6 show the third embodiment. This embodiment is very similar to the second embodiment except for the features described below. Therefore, reference should be made to the first and second embodiments in respect of the not descried matters.

If the carcass cords are relatively thick and spring back of the wound portion is strong, a cavity becomes liable to be formed between the wound portion and bead core during building a raw tire, and rate of occurrence of defective moldings increases. In such a case, this structure is preferably employed.

In this embodiment, the carcass ply 6A is not fully wound once around the bead core as in the former two embodiments.

The wound portion 6b in this embodiment is made up of a main part 10 which extends along the axially inner surface Si, radially inner surface SL and axially outer surface So of the bead core 5, describing a semicircle, and a departing part 11 which extends from the main part 10 towards the carcass main portion 6a, separating from the bead core 5.

The departing part 11 extends substantially straight towards the carcass main portion 6a, while inclining at an angle β of not more than 75 degrees with respect to the radially outer surface SU of the bead core 5. The departing part 11 in this example is straight, but it may be curved as far as the radius of curvature is large, for example, at least 100 mm.

Here, the angle β is defined as the angle of a straight line Z, which is drawn between the end point P2 of the departing part 11 and the separating point P1 of the departing part 11 from the bead core 5, measured with respect to the radially outer surface SU.

If the separating point P1 is not clear, an intersecting point of an extension of the radially outer surface SU with the wound portion 6b can be used instead. In case of the curved departing part 11, the radius of curvature thereof is defined as that of the circular arc passing three points which are the above-mentioned separating point P1 and end point P2 and the middle point therebetween.

The distance La of the intersecting point P3 of the straight line Z with the carcass main portion 6a is set in the range of from 5 to 15 mm, preferably 7 to 15 mm from the radially outer surface SU.

The gap Lb between the end point P2 of the departing part 11 and the carcass main portion 6a (point P3 on the axially outer face) is set in the range of not less than 1 mm, preferably more than 2 mm, but not more than 5 mm, preferably less than 4 mm.

In the triangular space surrounded by the departing part 11, the carcass main portion 6a and the radially outer surface SU of the bead core 5, there is disposed a rubber filler 12. As the hard rubber bead apex 8 which is relatively large in comparison with the rubber filler 12, is disposed radially outside the departing part 11, the departing part 11 receives a large stress from the bead apex 8 when the tire is deformed. Therefore to mitigate the stress and thereby to prevent separation of the departing part 11 from the adjacent rubber, the rubber filler 12 is made of a relatively low modulus rubber. The complex elastic modulus Ea* of the rubber filler 12 is set in the range of from 3 to 13 Mpa, preferably 3 to 7 Mpa. If the complex elastic modulus Ea* is less than 3 Mpa, the steering response and stability are liable to deteriorate. If the complex elastic modulus Ea* is more than 13 Mpa, it becomes difficult to prevent cord loose at the ply edge and the like. Here, the complex elastic modulus is measured is measured with a viscoelastic spectrometer manufactured by IWAMOTO SEISAKUSYO under the following measuring conditions: temperature of 70 deg. C., frequency of 10 Hz and dynamic distortion of plus/minus 2%.

As to the cross sectional shape of the rubber filler 12, a generally isosceles triangle having the base adjacent to the radially outer surface SU of the bead core 5 is preferably used not to deteriorate the steering response and the like.

If the above-mentioned distance La of the point P3 from the radially outer surface SU is more than 15 mm, a ply edge separation becomes liable to occur at the end P2 of the departing part 11.

If the gap Lb between the end point P2 and the carcass main portion 6a is less than 1 mm, a ply edge separation at the end P2 and fretting wear of the carcass cords in the main portion 6a are liable to occur. If the gap Lb is more than 5 mm, securing of the departing part 11 becomes insufficient and blowing out is liable to occur.

In this embodiment too, the bead apex rubber 8 is disposed radially outside the wound portion 6b. But, the bead apex rubber 8 is composed of a stiffener 8A disposed adjacent to the departing part 11, and a buffer 8B disposed radially outside the stiffener. The stiffener 8A is made of harder rubber having a complex elastic modulus Eb* of from 35 to 60 Mpa. The buffer 8B is made of softer rubber having a complex elastic modulus Ec* less than the complex elastic modulus Eb* but more than the complex elastic modulus Ea* of the rubber filler 12.

In view of the steering response and stability, to compensate for a relatively low modulus of the rubber filler 12, the bead portion 4 may be provided with a bead reinforcing layer 15.

The bead reinforcing layer 15 is, as shown in FIG. 6, disposed outside the carcass, and comprises: a curved base portion 15A which adjoins the main part 10 of the wound portion 6b; an axially outer portion 15o which extends radially outwards and axially outwards, separating from the main part 10; and an axially inner portion 15i which extends radially outwardly, adjoining the carcass main portion.

The bead reinforcing layer 15 is composed of a single ply of steel cords which are arranged at an angle of from 10 to 40 degrees with respect to the tire circumferential direction to cross the carcass cords. At the radially outer end of the axially inner portion 15i, it is disposed off the carcass ply 6a by a small distance Gp of about 0.5 to 1.0 mm to prevent between-ply separation.

If the radial height Hb of the axially inner portion 15i is more than 70 mm, the stress which concentrates on the outer edge is increased, and separation failure is liable to start from the edge. Further, as the vertical rigidity increases, the ride comfort is liable to deteriorate. Therefore, the radial height Hb is set in the range of not more than 70 mm from the bead base line BL. Further, in view of reinforcing effect, the height Hb is preferably set in the range of not less than 10 mm, preferably not less than 25 mm, more preferably not less than 40 mm.

If the radial height HC of the axially outer portion 15o is more than 20 mm, the stress which concentrates on the outer edge increases and similar problems arise. Therefore, the radial height HC of the axially outer portion 15o is set in the range of not more than 20 mm from the bead base line BL, but not less than 5 mm in view of reinforce effect.

As one of modifications, however, it may be possible to omit the axially inner portion 15i. Further, it may be possible to terminate the axially inner end of the curved base portion 15A at the same level as the bead base line BL.

In this embodiment, similarly to the second embodiment, a carcass profile which comprises a mid-outer part A1, a mid-inner part A2 and a substantially straight part 6a1 is employed.

The straight part 6a1 extends radially outwardly from the radially inner end P4 of the main portion 6a at the axially inner end of the bead core. The radial height h1 of the straight part 6a1 is not less than 50%, preferably not less than 60%, more preferably not less than 70% of the radial height h0 of the bead apex rubber 8, but less than that of the maximum cross sectional width point Pm, each from the bead base line BL.

Comparison Tests

Radial tires of size 11R22.5 for truck and bus having the structure shown in FIGS. 5 and 6 and the same specifications except for those shown in Table 3 were made and tested for the bead strength and bead durability, and defective moldings were checked.

The tread pattern was a five-rib pattern comprising substantially equi-width ribs divided by four main circumferential grooves having a depth of 14 mm. The tread width was 230 mm.

Bead Strength Test (Hydraulic Pressure Test)

The test tire was mounted on a 7.50×22.5 wheel rim, and the inside thereof was pressurized by injecting water using the tire valve, and the pressure at which the tire was busted was measured. The results are indicated by an index based on Conventional bulky bead structure (Conv.) being 100, wherein the large the index number, the higher the strength.

Bead Durability Test

Same as Second Embodiment.

Defective Molding Test

As to each tire, one hundred pieces were manufactured by way of trial, and utilizing x-ray transmission computed tomography, the tires were checked for cavity to obtain the rate of incidence of defective moldings.

TABLE 3

| Tire | Conv. | Ex. C1 | Ex. C2 | Ex. C3 | Ex. C4 | Ex. C5 | Ex. C6 |
|---|---|---|---|---|---|---|---|
| Bead Structure | FIG. 7*1 | FIG. 6 | FIG. 6 | FIG. 6 | FIG. 6 | FIG. 6 | FIG. 6 |
| Distance La (mm) | — | 8 | 13 | 3.5 | 8 | 8 | 8 |
| Gap Lb (mm) | — | 4 | 4 | 4 | 8 | 4 | 4 |
| Rubber filler 12 | — | | | | | | |
| Complex elastic modulus E * a (MPa) | — | 4 | 4 | 4 | 4 | 11 | 4 |
| Bead reinforcing layer | | | | | | | |
| height Hc (mm) | 25 | 15 | 15 | 15 | 15 | 15 | 15 |
| height Hb (mm) | 55 | 55 | 55 | 55 | 55 | 55 | 25 |
| Bead strength | 100 | 125 | 108 | 125 | 110 | 113 | 115 |
| Bead durability | 100 | 120 | 107 | 120 | 110 | 110 | 115 |
| Defective moldings (%) | 100 | 0 | 0 | 0 | 0 | 0 | 0 |

TABLE 3-continued

| Tire | Ex. C7 | Ref. C1 | Ref. C2 | Ref. C3 | Ref. C4 | Ref. C5 | Ref. C6 |
|---|---|---|---|---|---|---|---|
| Bead Structure | FIG. 6 | FIG. 6 | FIG. 6 | FIG. 6 | FIG. 6 | FIG. 6 | FIGS. 3 & 4 |
| Distance La (mm) | 8 | 2 | 17 | 8 | 8 | 8 | 2 |
| Gap Lb (mm) | 4 | 4 | 4 | 0.5 | 12 | 4 | 4 |
| Rubber filler 12 | | | | | | | |
| Complex elastic modulus E * a (MPa) | 4 | 4 | 4 | 4 | 4 | 15 | 4 |
| Bead reinforcing layer | | | | | | | |
| height Hc (mm) | 15 | 15 | 15 | 15 | 15 | 15 | 15 |
| height Hb (mm) | 0 | 55 | 55 | 55 | 55 | 55 | 55 |
| Bead strength | 105 | 125 | 85 | 120 | 75 | 120 | 120 |
| Bead durability | 102 | 120 | 80 | 50 | 75 | 75 | 70 |
| Defective moldings (%) | 0 | 80 | 0 | 0 | 0 | 0 | 5 |

*1 The carcass ply edge was turned up around the bead core and the turned up portion 6c extended up to a height h2 of 65 mm from the bead base line along the axially outer surface of the bead apex rubber.

The invention claimed is:

1. A pneumatic tire comprising
a tread portion with tread edges,
a pair of sidewall portions,
a pair of bead portions each with a bead core therein, and
a carcass ply of cords comprising
a main portion extending between the bead cores through the tread portion and sidewall portions and
a wound portion wound around the bead core in each said bead portion from the inside to the outside of the tire, and
an edge of the wound portion disposed between the bead core and a bead apex rubber disposed radially outside the bead core to be secured therebetween, wherein
in a meridian section of the tire mounted on a standard wheel rim and inflated to 5% of a standard pressure,
a straight line (K), which is drawn between: an intersecting point (Pa) of a radial line (X) extending radially outwardly from the centroid of the bead core with the carcass main portion; and an intersecting point (Pb) of a straight line (Y) extending axially inwards from the centroid of the bead core in parallel to the radially inner surface (SL) of the bead core with the carcass ply, has an inclination angle (theta) of from 50 to 60 degrees with respect to the straight line (Y).

2. The pneumatic tire according to claim 1, wherein said edge of the wound portion is disposed adjacent to a radially outer surface (SU) of the bead core.

3. The pneumatic tire according to claim 1, wherein the wound portion comprises:
a main part which extends along the axially inner surface (Si), radially inner surface (SL) and axially outer surface (So) of the bead core; and
a departing part which extends from the main part towards the carcass main portion, separating from the bead core, substantially straightly at an angle of not more than 75 degrees with respect to the radially outer surface of the bead core,
a distance (La) to the radially outer surface (SU) of the bead core from an intersecting point (P3) of a straight line which is drawn between the separating point (P1) of the wound portion from the bead core and the end (P2) of the wound portion, with the carcass ply main portion is in a range of from 5 to 15 mm,
a gap (Lb) of from 1 to 5 mm is provided between the end (P2) of the wound portion and the intersecting point (P3), and
a rubber filler having a complex elastic modulus of from 3 to 13 Mpa is disposed in a triangular space surrounded by the wound portion, the carcass ply main portion and the radially outer surface of the bead core.

4. The pneumatic tire according to claim 3, wherein the distance (La) is in a range of from 7 to 15 mm.

5. The pneumatic tire according to claim 3, wherein the complex elastic modulus is in a range of from 3 to 7 Mpa.

6. The pneumatic tire according to claim 3, wherein the cross sectional shape of the rubber filler is a substantially isosceles triangle.

7. The pneumatic tire according to claim 3, wherein
the bead portion is provided with a bead reinforcing layer disposed outside the carcass,
the bead reinforcing layer comprises: a curved base portion which adjoins the main part of the wound portion; and an axially outer portion which extends radially outwards to a radial height (Hc), separating from the main part, and
the radial height Hc is in a range of from 5 to 20 mm from the bead base line.

8. The pneumatic tire according to claim 7, wherein
the bead reinforcing layer further comprises an axially inner portion which extends radially outwardly to a radial height (Hb), adjoining the carcass main portion, and
the radial height (Hb) is in a range of not more than 70 mm from the bead base line.

9. The pneumatic tire according to claim 1, the tire being suitable for use as a heavy duty radial tire for trucks and buses, and wherein
the overall thickness (t) of the tire at the tread edges is in a range of from 38 to 45 mm, and
in said meridian section of the tire:
the tread face of the tread portion has a radius of curvature (RT) of from 800 to 1500 mm, and a camber height (h) of from 1.0 to 10 mm at the tread edge;
a radial height (L1) from the centroid of the bead core to said intersecting point (Pa) is in a range of from 0.15 to 0.28 times a radial height (Hm) from the bead base line to the maximum cross sectional width point (Pm) of the carcass main portion.

10. The tire according to claim 9, wherein the tire size is 11R22.5.

11. The tire according to claim 1, wherein said inclination angle (theta) is more than 52 degrees.

12. The tire according to claim 1, wherein the carcass main portion in the sidewall portion has a profile comprising
- a mid-outer part (A1) extending radially outwards from the maximum cross sectional width point (Pm) of the carcass main portion and having a radius of curvature (r1), and
- a mid-inner part (A2) extending radially inwards from the point (Pm) and having a radius of curvature (r2) larger than the radius (r1).

13. The tire according to claim 12, wherein the radius of curvature (r2) is in a range of from 1.5 to 2.0 times the radius (r1).

14. The tire according to claim 12 or 13, wherein the maximum cross sectional width point (Pm) is at a radial height (h1) of more than 50 % of the tire section height (H), each from the bead base line.

15. The tire according to claim 12, wherein said profile further comprises a substantially straight part between the radially inner end of said mid-inner part (A2) and the bead core.

16. A heavy duty radial tire for trucks and buses comprising
- a tread portion with tread edges,
- a pair of sidewall portions,
- a pair of bead portions each with a bead core therein, and
- a carcass ply of cords comprising
  - a main portion extending between the bead cores through the tread portion and sidewall portions and
  - a wound portion wound around the bead core in each said bead portion from the inside to the outside of the tire, and
  - an edge of the wound portion disposed between the bead core and a bead apex rubber disposed radially outside the bead core to be secured therebetween, wherein
- in a meridian section of the tire mounted on a standard wheel rim and inflated to 5% of a standard pressure:
  - the tread face of the tread portion has a radius of curvature (RT) of from 800 to 1500 mm, and a camber height (h) of from 1.0 to 10 mm at the tread edge; and
  - a radial height (L1) from the centroid of the bead core to an intersecting point (Pa) of a radial line (X) extending radially outwardly from the centroid of the bead core with the carcass main portion is in a range of from 0.15 to 0.28 times a radial height (Hm) from the bead base line to the maximum cross sectional width point (Pm) of the carcass main portion, and
  - the overall thickness (t) of the tire at the tread edges is in a range of from 38 to 45 mm.

17. The tire according to claim 16, wherein the tire size is 11R22.5.

* * * * *